United States Patent [19]
Basavanhally

[11] Patent Number: 5,953,474
[45] Date of Patent: Sep. 14, 1999

[54] OPTICAL FIBER COUPLER

[75] Inventor: Nagesh R. Basavanhally, Trenton, N.J.

[73] Assignee: Lucent Technologies, Inc., Murray Hill, N.J.

[21] Appl. No.: 09/001,535

[22] Filed: Dec. 31, 1997

[51] Int. Cl.⁶ .................................................. G02B 6/38
[52] U.S. Cl. ................................. 385/60; 385/72; 385/78
[58] Field of Search ................................. 385/60, 72, 78, 385/53, 55, 58, 66, 70, 77, 84

[56] References Cited

U.S. PATENT DOCUMENTS

| | | | |
|---|---|---|---|
| 4,615,581 | 10/1986 | Morimoto | 385/60 |
| 5,608,828 | 3/1997 | Coutts et al. | 385/59 |

Primary Examiner—Phan T. H. Palmer
Attorney, Agent, or Firm—Michael Y. Epstein

[57] ABSTRACT

An optical coupler having two prongs extending axially therefrom in opposite directions comprises a first connector comprising a first prong extending outwardly from a first end of a first elongated tubular member. A first coupling sleeve is concentrically mounted around the first tubular member in axially movable, spring biased relation therewith. A second connector comprises a second prong-containing tubular member fixedly telescoped within a second end of the first tubular member. A second coupling sleeve is mounted in axially movable, spring biased relation with the second tubular member by pins secured to and extending through the second coupling sleeve into engagement with a spring mounted on the second tubular member.

11 Claims, 2 Drawing Sheets

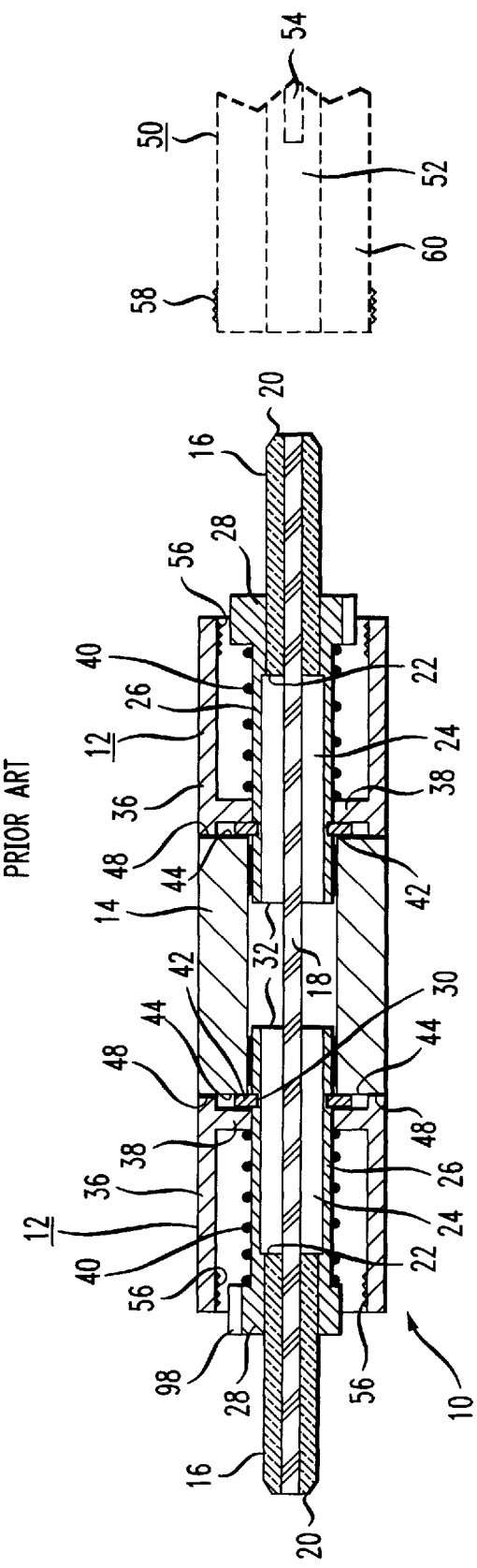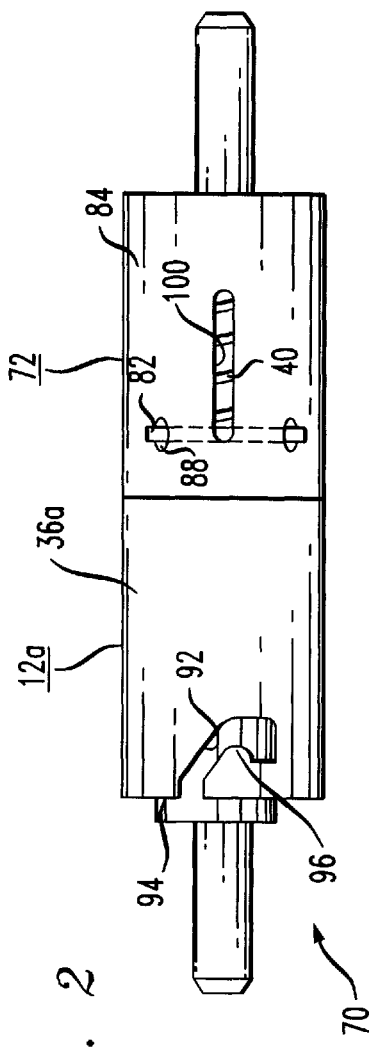
FIG. 1 PRIOR ART
FIG. 2

OPTICAL FIBER COUPLER

BACKGROUND OF THE INVENTION

This invention relates to optical fibers, and particularly to optical fiber couplers comprising two oppositely extending prongs.

Typically, optical fiber transmission lines terminate at both ends in prong-type connectors which are inserted into sockets of optical components interconnected by the fiber. In telephone networks, for example, the optical components are mounted on circuit boards removably housed within equipment cabinets. Although the optical fiber lines can be connected directly to the components on the circuit board, the preferred practice, for avoiding damage of the optical components, is to terminate the fiber lines on sockets fixedly mounted on face plates of the circuit boards. The face plate sockets readily withstand shocks and stresses caused by repeated couplings and decouplings of different transmission lines as is often required for accommodating changes in the network configuration. The faceplate sockets are connected to components on the circuit board by relatively light weight optical fibers which impose little stresses on the components.

A problem addressed by the present invention is the coupling of a faceplate socket to an optical component mounted on the circuit board as closely as possible to the socket for maximum utilization of the circuit board area. For such close spacing coupling, the hereinafter described two-prong coupler was developed. It was subsequently learned that a similar two-prong coupler is commercially available. A description of such known coupler and a comparison of it with the inventive coupler are hereinafter provided. However, while the inventive coupler is advantageously shorter than the known coupler, a full evaluation of the relative merits of the two couplers has not been made.

SUMMARY OF THE INVENTION

A two-prong optical coupler Comprises, at a first end, a single-plug connector, preferably of known type, comprising an elongated first prong fixedly received within a first hollow tubular member, and a first coupling sleeve concentrically mounted around the tubular member in spring-biased, axially movable relation therewith. One end of the prong extends axially outwardly from one end of the tubular member while the other end of the prong terminates within the first tubular member. A second hollows tubular member containing a second prong is telescoped within and fixedly secured to the first tubular member with the second prong extending axially away from the first prong. A second coupling sleeve is concentrically mounted around the second tubular member and in axially abutting relationship with the first coupling sleeve. The second coupling sleeve is spring biased for axial movement relative to the second tubular member by means of a coiled spring mounted on the second tubular member. The spring is compressively clamped between an annular shoulder on the second tubular member and ledges on the inside of the second coupling sleeve provided by pins extending transversely through the second coupling sleeve.

A method of assembly of the inventive coupler includes (among other steps to be described) the steps of inserting a pointed tool through an axially extending slot through the wall of the second coupling sleeve for engaging the spring on the second tubular member, axially moving the spring for compressing the spring against the second tubular member annular shoulder, and then locking the spring in place by inserting pins between oppositely disposed holes through the wall of the second coupling sleeve into tangential and spring engaging relation with the second tubular member.

DESCRIPTION OF THE DRAWINGS

FIG. 1 is a side sectional view of a known double-ended optical fiber coupler comprising two known back-to-back single prong connectors;

FIG. 2 is a side view of a double-ended optical fiber connector according to the present invention;

DESCRIPTION OF PREFERRED EMBODIMENTS OF THE INVENTION

Figure 3:
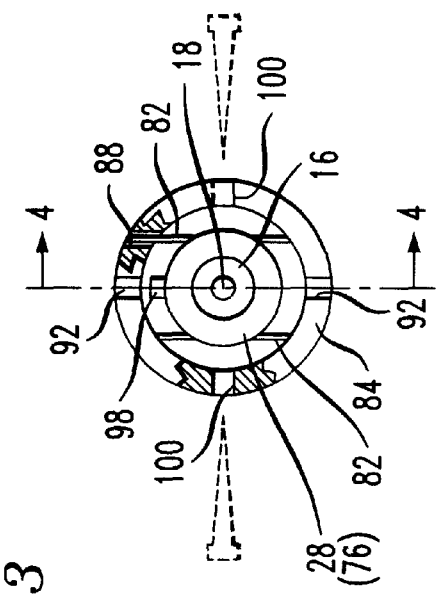
FIG. 3 is a partially broken-away end view, looking right-to-left, of the coupler shown in FIG. 2.

FIG. 1 shows a known double-ended prong-type coupler 10. The coupler 10 essentially comprises two single-ended prong connectors 12 of the type normally used at the ends of fiber optic lines but directly connected together in the coupler 10 in back-to-back relation by an intermediate rigid sleeve 14 rigidly bonded, as by epoxy glue, to both connectors 12.

In the following description, each connector 12 is described as being at a respective "front" end of the composite coupler 10 (the coupler thus having two front ends). "Rear" portions of the two connectors 12 face towards one another in a central portion of the coupler 10.

Each connector 12 comprises an axially extending tubular prong 16 of precise dimensions and typically of a ceramic material. An optical fiber 18 fits snugly through an axial passageway through each prong and terminates flush with front ends 20 of the prongs. The fiber 18 extends rearwardly from respective rear ends 22 of the prongs 16 and entirely through the coupler 10 from end to end thereof.

Within each connector 12, the prong 16 is fixedly secured within an axial passageway 24 through an elongated tubular member 26, e.g., of stainless steel. The tubular member 26 is of constant outside diameter except for a first end portion 28 of increased diameter and a circumferential groove 30 in the outer surface of the member 26 near the rear end 32 thereof. One end of each prong extends axially forward of the enlarged portion 28 of the tubular member 26 in which it is fixed, and the prong rear ends 22 terminate within their tubular members inwardly of the rear ends 32 thereof.

Concentrically mounted on each of the tubular members 26 is a tubular coupling sleeve 36 including an integral internal annular ledge 38 through which the tubular member 26 extends in slidable fit. Mounted around each of the tubular members 26 is an elongated coiled spring 40, the ends of which bear against an annular ledge provided by the enlarged first end portion 28 of the tubular member 26 and the internal annular ledge 38 of the coupling sleeve 36. Each spring 40 is under compression, and the tubular member 26 is maintained in place within the coupling sleeve 36 by means of a C-ring 42 snap-fitted within the circumferential groove 30 around the wall of the tubular member 26.

Each of the compressed coil springs 40 is of an outer diameter less than the inside diameter of its encircling coupling sleeve 36, and the mounting arrangement shown admits of both tilting and sliding movements of the coupling sleeves 36 relative to the tubular members 26. The spring compression, however, is relatively great, and, in the absence of external forces, each of the springs 40 within each connector 12 forces the annular ledge 38 of the coupling sleeve 36 against the C-ring 42 to maintain the coupling sleeve 36 in firm, stationary and coaxial relationship with the tubular member 26.

As shown in FIG. 1, the inside diameter of the intermediate sleeve 14 corresponds generally to the outside diameters of the tubular members 26, and the outer diameter of the intermediate sleeve 14 corresponds to the outer diameter of the two coupling sleeves 36. The rear ends 32 of the two tubular members 26 extend relatively snugly within the intermediate sleeve 14 and are cemented, as with an epoxy cement, to the inside surface of the wall of the sleeve 14. Within the sleeve 14, the two tubular members 26 extend towards one another but do not meet. The two ends 44 of the intermediate sleeve 14 abut against the C-rings 42 of the two connectors 12. The rear ends 48 of the coupling sleeves 36 extend rearwardly of the annular ledges 38 therein a distance generally equal to the axial length of the C-rings 42. Thus, when the coupling sleeve ledges 38 are spring pressed against the C-rings 42, the two coupling sleeves 36 abut against opposite ends 44 of the intermediate sleeve 14 and form, with the intermediate sleeve 14, a generally continuous outer housing of the coupler 10. The two coupling sleeves 36, however, are axially movable relative to the intermediate sleeve 14 which is firmly secured to the two tubular members 26.

In use, each prong 16 of the coupler 10 can be inserted, in known fashion, within a socket 50 (shown in dash lines in FIG. 1) with the extending prong 16 snugly received within an elongated passageway 52 of the socket and end abutted with an optical fiber 54 (or the like) fixed within the passageway. For firmly pressing together the ends of the two optical fibers being optically coupled, the coupling sleeve 36 associated with each prong 16 is pulled firmly against a corresponding coupling member of the socket. In the coupler 10 shown in FIG. 1, this is accomplished by screwing the coupling sleeve 36, by means of an internal screw thread 56, onto an external screw thread 58 of a hollow bolt 60 into which the prong 16 is inserted. The dimensions of the coupler 10 and mating socket 50 are selected so that, as the coupling sleeve is first screwed into the bolt, the leading end 20 of the prong 16 first engages the front end of the fiber 54 within the socket 50. With continued screwing of the coupling sleeve 36, the coupling sleeve 36 moves axially forward of the prong 16 by further compression of the coiled spring 40. The result is a firm, spring-biased contacting between the two optical fibers 16 and 54 being optically coupled.

Each connector 12 of the coupler 10 is first fully assembled prior to the assembly of the connectors 12 into a completed coupler 10. Thus, the prong 16 of each connector 12 is first fixed in place within and extending outwardly of its tubular member 26. The spring 40 is then inserted onto the tubular member 26 and against the enlarged portion 28 thereof, and the spring-carrying tubular member 26 is then threaded into the coupling sleeve 36 and through and beyond the annular ledge 38 within the coupling sleeve. The coupling sleeve 36 is then forced forwardly (e.g., by hand) along the tubular member 26 for compressing the spring and moving the circumferential groove 30 on the tubular member 26 rearwardly and outwardly of the end 48 of the sleeve 36. The C-ring 42 is then snapped in place within the thus exposed groove 30 and the assembling force released for allowing the C-ring 42 to be drawn inwardly of the coupling sleeve 36 until the C-ring engages the coupling sleeve internal ledge 38.

The complete coupler 10 is then assembled by threading an end of an optical fiber 18 through one of the connectors 12 through the rear end 32 of the tubular member 28 thereof, and the other end of the fiber is then threaded through the intermediate sleeve and through the outer connector 12. An epoxy cement is then applied around the rearwardly extending portion of the tubular members 26, and such portions are inserted into opposite ends of the intermediate sleeve 14 until the sleeve ends 48 abut against the C-rings 42 in the tubular members 26. Upon curing of the epoxy cement, ends of the fiber 18 extending forwardly of the two prongs 16 are cut-off flush with the prong ends to complete the coupler 10.

An inventive coupler 70 in accordance with the present, invention is now described. The inventive coupler 70 (FIGS. 2–4) also comprises two back-to-back connectors 12a and 72 and, in a preferred embodiment, the connector 12a can be substantially identical to, or be a slightly modified version of, the connectors 12 used in the known coupler 10. A reason for such use of the known connectors 12 is that they are extensively used in this optical fiber industry as single-prong connectors at the ends of optical fiber transmission lines. Thus, such connectors are readily available and relatively inexpensive, even if slightly modified in accordance with the present invention.

In the herein illustrated embodiment of the inventive coupler 70, the connector 12a is shown slightly different from the known connector 12 used in the known coupler 10, and the subscript "a" is used to indicate that one or more slight differences exist. Parts of the connector 12a which can be identical to corresponding parts of the known connectors 12 are identified by the same reference numerals. The connector 72 of the inventive coupler uses parts (or structural details) which can be identical to corresponding parts of the known connectors 12 and, with such parts, the same reference numerals are used.

As above-explained, the connector 12a of the inventive coupler 70 can be substantially identical to the known connectors 12 of the known coupler 10. (One small, and essentially optional difference is hereinafter described.) Owing to the substantially identical structure of the two connectors 12 and 12a, the foregoing detailed description of the structure and assembly of the known connectors 12 is relied upon for the description of the connector 12a used in the inventive coupler 70.

The connector 72 of the inventive coupler 70 is now described.

The coupler connector 72 is similar to the known connectors 12 in that it includes a prong 16, which can be identical to the prong 16 in the connectors 12, fixedly mounted within and extending outwardly from (FIG. 4) a tubular member 76, e.g., of stainless steel. The portion of the prong 16 extending forwardly of the tubular member 76 comprises the second prong of the inventive coupler 70.

Figure 4:
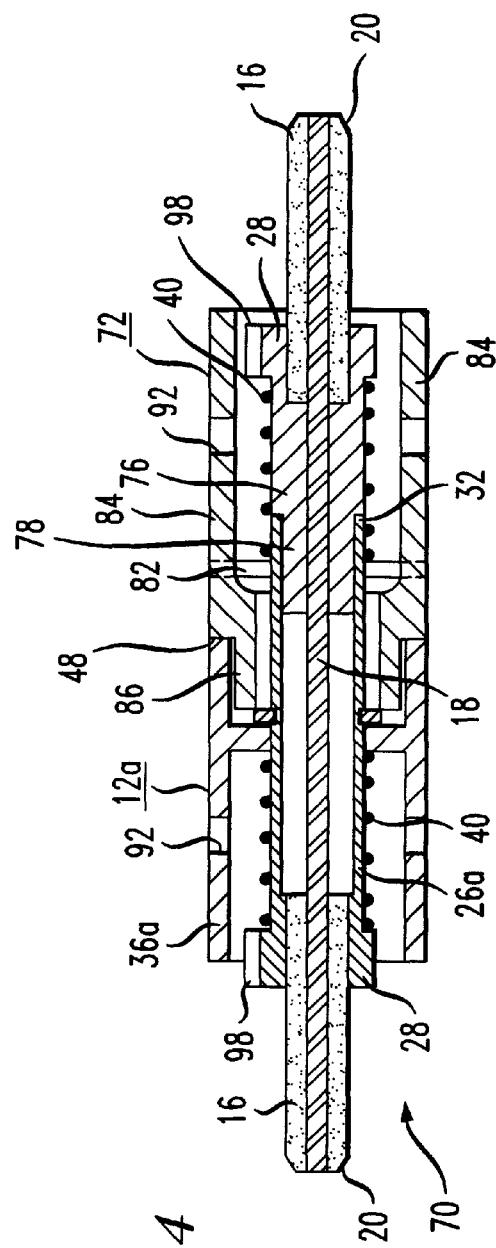
FIG. 4 is a sectional view of the inventive coupler taken along line 4—4 of FIG. 3.

The tubular member 76 is similar to the tubular member 26 of the connectors 12 in that it includes a portion 28 of enlarged diameter at a front end of a rearwardly extending hollow tube. The rearwardly extending tube of the tubular member 76 differs from that of the tubular member 26 in that it is not of uniform outer diameter but includes an end portion 78 of reduced diameter. As shown in FIG. 4, the reduced diameter portion 78 of the tubular member 76 is snugly telescoped within the open rear end 32 of the connector 12a portion of the coupler 70. Thus, in the inventive coupler, the two tubular members 26 and 76 are directly interconnected in contrast to the gap between the two tubular members 26 in the known coupler 10 shown in FIG. 1. With tubular members of comparable dimensions in the known and inventive couplers, the direct engagement of the two tubular members 26a and 76 in the inventive coupler 70 results in a coupler of reduced length. This allows closer spacings between components (e.g., a socket on a circuit board face plate and an adjacent optical component) being connected together by the coupler.

The telescoped relationship of the two tubular members 26a and 76 maintains them in coaxial alignment.

Another difference of the tubular member 76 compared to the tubular member 26 of the known connectors 12 is that the tubular member 76 does not include a circumferential groove for receipt of a C-ring. A compression spring 40 is present on the tubular member 76 (the spring 40 serving the same function as the spring 40 on the tubular member 26) but an arrangement not using a C-ring is used for maintaining the spring 40 in place. For this function, two pins 82 are used which are not directly mounted on the tubular member 76 (as is the C-ring 42 on the tubular member 26), but which are disposed (FIG. 3) essentially tangential to the tubular member 76, on opposite sides of the tubular member 76, and so close to it as to serve as ledges against which an end of the spring 40 abuts. The two pins 82 are mounted on a coupling sleeve 84 now described.

The coupling sleeve 84 of the coupler connector 72 serves the same function as the coupler sleeve 36 of the known connectors 12 in that it encloses the tubular member 76 and provides a means for firmly mounting the coupler 70 on a mating socket such as the socket 50 shown in FIG. 1. The coupling sleeve 84 (FIG. 4) directly engages the coupling sleeve 36a of the coupler connector 12a (unlike the arrangement in the coupler of FIG. 1) and, to this end, the sleeve 84 includes a portion 86 of reduced diameter which is snugly but slidably telescoped within the open, rear end 48 of the coupling sleeve 36a. No intermediate sleeve comparable to the intermediate sleeve 14 of the FIG. 1 coupler 10 is present between the two coupling sleeves 36a and 84. This is consistent with the reduced length of the coupler 70 compared to the FIG. 1 coupler 10.

The aforementioned pins 82 for maintaining the spring 40 in place are snugly received in pairs of aligned openings 88 on each side of the coupling sleeve 84. The pins 82 (FIG. 3) are non-diametrical chords spanning the circular cross section of the coupling sleeve 84 and, as noted, are disposed tangentially to the circular tubular member 76 disposed axially within the sleeve 84. (In FIG. 3, the pins 82 are shown rearwardly and radially inwardly of the enlarged front end portion 28 of the tubular member 76.) The pins 82 are large enough and positioned sufficiently close to the tubular member 76 to firmly engage an end of the spring for retaining it in place but without interference with relative axial movements between the coupling sleeve 84 and the tubular member 76 (or between the two coupling sleeves 36a and 84).

The coupling sleeves 36 of the FIG. 1 coupler 10 have internal threads 56 for screwing onto a socket bolt 60. Such internal threads can be used with the coupling sleeves 36a and 84 of the coupler 70 but, in this embodiment, a different, but known, arrangement is used for tightening the coupler 70 against a socket 50a. As shown in FIG. 2, a slot 92 is provided extending axially rearwardly from the front end 94 of the coupling sleeve 36a and then circumferentially past a locking tip 96. Similar slots 92 are provided on the coupling sleeve 84; such slots 92, however, not being visible in FIG. 2 but being partly shown in FIG. 3. In use, as known, the coupling sleeve slot 92 is aligned with a pin on a socket, the coupler 70 is moved forward of the socket pin, and the coupling sleeve 36a or 84 is then rotated for locking the socket pin behind the locking tip 96 of the slot 92. (For ease of illustration and understanding, the slot 92 is shown extending entirely to the end 94 of the coupling sleeve 36a. Typically, the slot 92 is closed at the front edge 94 of the coupling sleeves 36a and 84, and the socket cooperating pin is spring loaded for snap-fitting into the slot 92.)

Preferably, in the coupler-socket mounting process, only the coupling sleeve 36a or 84 is rotated but not the tubular member 26a or 76. Preventing rotation of the tubular member 26a or 76, for thus preventing rotation of the prongs 16 fixedly mounted within the tubular members, prevents grinding of the contacting faces of the optical fibers being coupled together. For preventing rotation of the tubular members, short length, radially extending pegs 98 are provided towards the front ends of the tubular members 26a and 76 which engage within corresponding slots in the socket. Similar pegs 98 are shown in the known coupler 10.

FIG. 2 also shows an axially extending slot 100 through the wall of the coupling sleeve 84. No such slot is present in the coupling sleeve 36a of the coupler connector 12a. The slot 100 (preferably one on each side of the coupling sleeve 84) is used in connection with the assembly of the coupler 70, as now described.

An initial step in the assembly of the coupler 70 is the provision of the coupler connector 12a. As previously explained, a commercially available connector, such as the connector described in connection with the FIG. 1 coupler 10, can be used.

A length of optical fiber 18 is then threaded through the connector 12a, inwardly from the rear end 32 of the tubular member 26a and extending from the rear end 32.

In the next steps of the assembly process, parts of the connector 72 of the coupler are mounted directly on the connector 12a. Thus, with a coiled spring 40 loosely mounted around the extending rear portion of the tubular member 76 of the not yet fully assembled connector 72 (the tubular member 76 containing a plug 16 fixed therein), the tubular member 76 rearwardly extending end portion 78 (coated with a layer of epoxy cement) is inserted into the open end 32 of the tubular member 26a of the connector 12a. (Prior to such insertion, the length of optical fiber 18 extending from the connector 12a is threaded entirely through the tubular member 76.) The epoxy is allowed to cure, thus firmly locking the two tubular members 12a and 76 together in coaxial alignment.

Then, the coupling sleeve 84, not including the pins 82, is mounted by inserting the reduced diameter end portion 86 of the sleeve 84 into the open end of the coupling sleeve 36a. At this point, the spring 40 is still loosely mounted on the tubular member 76, but rearwardly of the enlarged portion 28 thereof, and the coupling sleeve 84 is loosely received within the coupling sleeve 36a. No C-ring is present within the coupler connector 72 comparable to the C-ring 42 in the connector 12a.

Then, using a simple cradle-type jig (or the like) for preventing axial separation of the two coupling sleeves 12a and 72, two pointed tools (shown in dash lines in FIG. 3) are inserted through the two slots 100 through the wall of coupling sleeve 84 for contacting the loosely mounted spring 40 (not visible in FIG. 3 as being hidden by the enlarged end portion 28 of the tubular member 76) and for forcing it towards the enlarged portion 28 for compressing the spring. Then, the two pins 82 are inserted transversely across the coupling sleeve 84 through their aligned wall openings 88 for positioning the pins 82 rearwardly of the compressed spring but radially inwardly of the spring outer diameter. Then, upon removal of the spring compressing tools, the spring 40 expands into contact with the locking pins 82. The force of the spring 40 against the pins 82 tends to retain the pins 82 in place (the pins also fitting relatively snugly within the sleeve openings 88).

The pins 82 serve the purpose of maintaining the spring 40 in place and under compression and the further purpose of locking the coupling sleeve 84 to the tubular member 76, but in spring biased, axially movable relation therewith.

The parts of the coupler 70 are now fully assembled and the coupler 70 is completed by cutting the portions of the optical fiber 18 extending from the two prongs 16 flush with the prong ends 20.

In the assembled together coupler 70, the two tubular members 26*a* and 76 are firmly secured together with an optical fiber 18 extending entirely through the coupler 70 and terminating flush with the ends 20 of the two oppositely extending prongs 16. Each coupling sleeve 36*a* and 84 is secured to its respective tubular member 26*a* and 76, but in spring-biased axially movable relation therewith. The two coupling sleeves 36*a* and 84 form an outer housing of the coupler 70 with the two sleeves 36*a* and 84 being in telescoped, sliding relation to one another.

What is claimed is:

1. A two-prong optical coupler comprising first and second prong connectors comprising respective first and second tubular members having first and second open ends and first and second hollow prongs disposed within respective said tubular members and extending outwardly therefrom through said first open ends, the tubular members of said connectors being directly secured together in axial alignment with the second end of said second tubular member of said second connector extending inwardly of the second end of said first tubular member of said first connector, and with the prongs of said tubular members extending in opposite directions and along a common axis from the coupler.

2. A coupler according to claim 1 wherein said connectors include respective first and second hollow coupling sleeves mounted concentrically around the tubular members of respective said connectors, said coupling sleeves adjoining one another along said common axis and forming a substantially continuous outer housing of the coupler.

3. A coupler according to claim 2 wherein each of said coupling sleeves is mounted in spring biased axially movable relation with its corresponding tubular member.

4. A coupler according to claim 3 including a first coiled spring mounted on said second tubular member of said second connector for providing said spring biased relation between said second coupling sleeve and said second tubular member, and a pin secured to said second coupling sleeve and extending tangentially past said second tubular member for engaging said spring and retaining it in place on said second tubular member.

5. A coupler according to claim 4 including a second coiled spring mounted on said first tubular member and being retained, between a portion of said first tubular member and an annular ledge secured to said coupling sleeve and slidably disposed around said first tubular member, said spring being compressively stressed for urging said ledge against a C-ring secured around said tubular member.

6. A method of assembling a two-prong optical coupler comprising the steps of providing a first optical connector comprising a first tubular member having first and second open ends and containing a first hollow prong extending outwardly from said member first end and a first coupling sleeve concentrically mounted on said first tubular member in spring biased, axially movable relation therewith, disposing an optical fiber through said first prong and extending outwardly from said tubular member second end, disposing a coiled spring axially along and around a second tubular member having first and second open ends and between said second end and a spring retaining portion of said second tubular member adjoining said first end, said second tubular member containing a second hollow prong member extending outwardly from said first end thereof, threading said extending optical fiber through said second tubular member from said second end thereof and through said second prong therein, fixedly engaging said second end of said second tubular member within said second end of said first tubular member, and mounting a second coupling sleeve concentrically around said second tubular member and in spring biased, axially movable relation therewith.

7. A method according to claim 6 wherein the step of mounting said second coupling sleeve includes the steps of axially compressing said coiled spring against said spring retaining portion of said second tubular member, and, while said spring is compressed, engaging a spring retaining member secured to said second coupling sleeve with said spring for locking said spring in position.

8. A method according to claim 7 wherein the step of engaging said spring comprises mounting a pin on and through said second coupling sleeve and transversely past an end of said spring.

9. A method according to claim 8 wherein the step of axially compressing said spring comprises passing a tool through an axially extending slot through the wall of said second coupling sleeve for engaging said spring, and moving said tool for compressing said spring against said spring retaining portion.

10. A method according to claim 9 wherein the step of mounting said pin comprises passing said pin through and between a pair of circumferentially spaced apart openings through the wall of said second coupling sleeve.

11. A method according to claim 6 wherein the step of engaging said tubular member ends comprises telescoping one of said second ends within the other of said second ends.

* * * * *